United States Patent Office 3,118,985
Patented Jan. 21, 1964

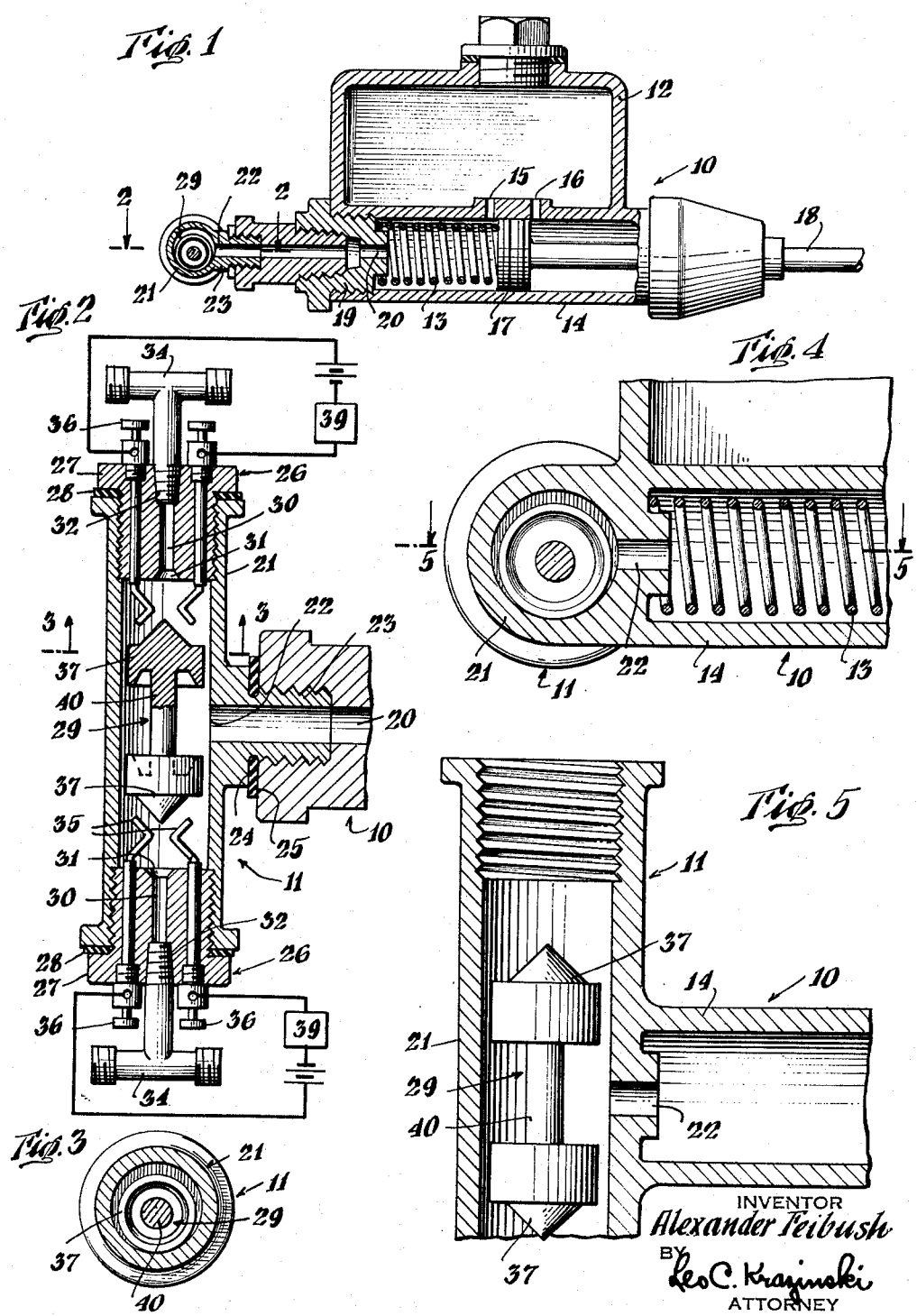

3,118,985
SHUT OFF VALVE FOR HYDRAULIC FLUID
VEHICLE BRAKING SYSTEMS
Alexander Feibush, Plainview, N.Y., assignor to Alex Manufacturing Corporation, Woodmere, N.Y., a corporation of New York
Filed Dec. 26, 1961, Ser. No. 179,265
8 Claims. (Cl. 200—82)

This invention is a continuation-in-part of co-pending application Serial No. 655,221, filed April 26, 1957, now abandoned, and relates to braking systems of the hydraulic type for vehicles having front and rear wheel brakes and, more particularly, to an improved shut-off valve primarily adapted for use in such systems.

One of the difficulties frequently encountered in connection with braking systems of the foregoing type is that a line extending from the master cylinder to one of the brakes springs a leak or is otherwise rendered incapable of confining the hydraulic fluid, whereby the hydraulic fluid in the master cylinder and its reservoir is drained therefrom and the master cylinder piston is rendered incapable of pressurizing and delivering fluid to the other brakes.

Accordingly, an object of the present invention is to provide a valve which prevents the foregoing difficulty in case of breakage or leakage of one of the lines extending to a brake by shutting off the supply of fluid to the pair of brakes involved.

Another object of the invention is to provide such a valve which is simple, practical and economical in construction and is reliable in operation.

Another object is to provide such a valve which can be constructed integrally with the master cylinder or can be supplied as a fitting adapted for connection to master cylinders already in use.

Another object is to provide such a valve which operates an indicating network in the event of the aforementioned contingency adapted to designate in which set of brakes the supply of fluid has been shut off because of a failure in one of the lines thereof.

A further object is to shut off the supply of fluid to the pair of brakes of which one is in trouble and to allow the other pair of brakes to function normally while the vehicle proceeds to a repair station.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

FIG. 1 is a longitudinal sectional view of a conventional master cylinder having a valve in accordance with the present invention connected thereto, FIG. 2 is an enlarged sectional view taken along the line 2—2 on FIG. 1, including a wiring diagram for the indicators, FIG. 3 is a sectional view taken along the line 3—3 on FIG. 2, FIG. 4 is a fragmentary sectional view illustrating the master cylinder and the valve constructed as an integral unit, and FIG. 5 is a portion of a sectional view taken along the line 5—5 on FIG. 4, Referring in detail to FIGS. 1 to 3 of the drawing, there is shown a conventional master cylinder 10 equipped with a valve 11 adapted for connection in a front and rear wheel brake system.

The master cylinder comprises a casing including a hydraulic fluid reservoir 12 and a cylinder 14 per se adjacent the reservoir and in fluid flow communication therewith by a fluid supply aperture 15 and a vent aperture 16, a piston 17 slidably mounted in the cylinder, a rod 18 for effecting movement of the piston and extending outwardly of the cylinder at one end thereof and arranged for operation by the brake pedal (not shown), a plug 19 screw threadedly secured into the other end of the cylinder and formed with a bore 20 which has its inner end in communication with the cylinder and is screw threaded at its outer end, and a spring 13 between the piston and the plug.

As best shown in FIG. 2, the valve 11 comprises a tubular body 21 having an inlet 22 at the middle thereof provided by a tubular nipple 23 threadedly secured into the bore 20 and formed with a shoulder 24 for compressing a sealing gasket 25, a plug member 26 threadedly secured into the body 21 at each end thereof and formed with a flange 27 for compressing a sealing gasket 28 against the ends of the tubular body. A shuttle valve element 29 fits loosely in the bore of the body and is freely movable therein and contained or immersed in the braking fluid in the body 21.

The plug members 26 each have a central outlet bore 30 formed with a valve seat 31 at the inner end and a threaded portion 32 at the outer end adapted for connection with a T-fitting 34 to which the lines leading to the brakes are connected. For example, the upper fitting may have the right and left front brakes connected thereto and the lower fitting may have the right and left rear brakes connected thereto, whereby fluid is supplied to each set of brakes (front and rear) by one of the outlets 30. The plug members 26 each have a pair of spaced apart switch contacts 35 adjacent the valve seat 31 and have a pair of terminals 36 at the outer end electrically connected to the switch contacts, respectively.

The valve element 29 has conical head portions 37 at the ends thereof each adapted to engage one of the seats 31 to shut off its outlet 30. The head portions 37 are formed of electrically conductive material and each is adapted to bridge one of the pairs of switch contacts 35 to electrically connect the same and thereby cause an indicating device 39 to be energized.

The heads 37 of the valve member have a slightly smaller diameter than the inner diameter of the body 21, whereby the valve member is freely movable and loose within the body, and are connected by a relatively thin rod-like member 40. This arrangement enables the fluid, within which the valve member 29 is contained, to pass the valve member and be discharged through the outlets and to exert pressure on the rear of the heads 37.

When the braking system is functioning normally, the pressure of the fluid exerted on the respective sides of each head 37 is the same or in equilibrium therefore the valve member 29 is retained in its central position, due to the balancing effect of the fluid, and the fluid passes around the heads 37 without effecting movement of the valve member. However, should a leak develop in one of the brakes of either set or its conduit connected to either one of the fittings 34, such leakage will cause a pressure drop between the inlet 22 and the outlet 30 associated with the leakage.

In the operation of the instant invention, it is important that the valve element 29 does not move toward closing relationship with any one of the outlets 30, except in response to the movement of the braking fluid operating downstream in the direction of a break and not in response to external forces, such as centrifugal forces, that may result from severe or erratic movements of the vehicle. If the valve element responded to such external forces, it would have a tendency to erroneously close one or the other of the outlets thereby falsely blocking the passage of fluid to the brakes associated with such erroneously closed outlet.

The invention is unique in that the density of the material from which the valve element 29 is constructed and the density or specific gravity of the brake fluid contained in the body 21, and within which the valve element is contained, are such that their specific gravities are substantially the same. Because the density of the valve element is substantially the same as that of the braking fluid, it actually floats freely in the brake fluid as a moving part of such brake fluid, free and loose from engagement with the walls of the body 21. Hence, the immersed floating valve element 29 remains unaffected by centrifugal or other external forces applied thereto during severe or erratic movements of the vehicle. The valve element is displaced from its normal central position as shown in FIG. 2 with and only as a result of the pressure of the braking fluid acting on its head portions 37 and moving in the direction of lower pressure of a defective outlet 30.

Hence, when the brakes are applied, the fluid being forced under pressure from the inlet 22 into the body 21 and around the valve element 29 rushes about the head portions 37 in the direction of the defective outlet having the leakage and pressure drop. This movement of fluid exerts a pressure on the head portion 37 closest to the defective outlet that is greater than that exerted on the other head portion 37 adjacent to the unaffected fluid oulet. Consequently, the valve element 29 is moved by the fluid pressure and with the fluid toward the defective outlet until its conical head fits within and fluid tightly engages the seat 31 of such outlet to close the same. By closing the defective outlet, all further flow of fluid therethrough is terminated. This prevents any possible additional loss of fluid through the defect or leak. In the meanwhile, the fluid is then saved to be directed toward the other or unaffected outlet 30 to operate the brakes connected therewith.

As the valve head 37 approaches into closing relationship with the leaky or defective outlet 30, it engages and electrically bridges the switch contacts 35 positioned adjacent to the defective fluid outlet to close a circuit to the indicating device 39. The switch contacts 35, bridged by the engaging head portion 37, are of resilient construction and normally have their contacting ends spaced laterally from each other and longitudinally spaced from their respective outlets 30. During normal operation, with fluid pressure in the body 21 in a state of equilibrium, the head portions 37 at the opposite ends of the valve element 29 are normally longitudinally spaced from each set of contacts 35 and unrestricted from movement thereby as shown in FIG. 2.

After the leak or defect is repaired, the fluid pressure in the body 21 again returns to a condition of equilibrium. Accordingly, the fluid pressure acting on both of the head portions 37 is equal and permits the valve element 29 to be biased away from the formerly defective outlet 30. This biasing is accomplished by the resilient switch contacts 35 engaging the bridging head portion 37 and acting thereagainst to move and displace the same away from the formerly defective outlet 30. The now equal fluid pressure acting about all the surfaces of the valve element 29 moves the valve element to its normally centered position as shown in FIG. 2 wherein its heads 37 are spaced from the displacing resilient electrical contacts 35. When once the valve element 29 is returned to its normally centered position by the equalized fluid pressures acting on all of its surfaces, it is again longitudinally spaced from the switch contacts 35 at opposite ends thereof and, therefore, is permitted unrestricted movement relative to such contacts.

The apparatus just described is so constructed and arranged that the shuttle valve and the indicating circuit can be readily installed in existing vehicles. However, as shown in FIGS. 4 and 5, it is contemplated that the present invention can be embodied in a master cylinder to the installed in vehicles when they are assembled or to replace a faulty master cylinder. This is accomplished by forming the master cylinder 10 and the tubular body 11 as an integral unit thus eliminating the use of an adapter plug 19 and the possibility of leakage sought to be prevented by the gasket 25. As shown herein, the wall of the body 21 is joined with the cylinder 14 and the inlet 22 of the body constitutes the outlet for the master cylinder.

Although now shown in FIGS. 4 and 5 for the sake of simplicity, the same end plugs 26, previously described in connection with FIGS. 1 to 3, are secured to tubular body 21 and the same valve member 29 is utilized. In this manner, the embodiment shown in FIGS. 1 to 3 and the embodiment shown in FIGS. 4 and 5 are standardized, whereby servicing of both embodiments will be facilitated because of their identical functional construction and operation. Both embodiments may be simplified by eliminating one of the end plugs 26, whereby an integral end portion is provided with inclusion of the bore 30, seat 31, and contacts 35.

From the foregoing description, it will be seen that the present invention provides a safety device for hydraulic fluid operated braking systems for vehicles having front and rear wheel brakes which device prevents unbalanced braking between the left and right brakes of a set of brakes, should leakage occur, without affecting the other set of brakes by retaining sufficient fluid in the master cylinder to operate the unaffected set of brakes. This is accomplished in a simple, practical and economical manner.

As various changes may be made in the form, construction, and arrangement of the parts herein, without departing from the spirit of and scope of the invention and without sacrificing any of its advantages, it is to be understood that all matters are to be interpreted as illustrative and not in any limiting sense.

What is claimed is:

1. In a hydraulic fluid operated braking system for vehicles having front and rear wheel brakes, the combination of a source of hydraulic fluid, a master cylinder having an outlet port and means for establishing fluid flow communication with said source, a piston in said cylinder for pressurizing the fluid therein and directing the same through said cylinder outlet port, a cylinder including a bore having an inlet at the middle thereof connected to said outlet port and having an outlet at each end thereof respectively adapted for connection to the front and rear brakes and each outlet formed with an inwardly facing valve seat, a normally unrestricted freely movable element having substantially the same density as and forming a part of said hydraulic fluid and smaller than and loosely fitted in the bore of said last mentioned cylinder, said element having surfaces on which the pressurized fluid normally acts to retain the same spaced from said valve seats when the pressure of the fluid at said outlets is substantially equal, and a valve head at each end of said element for engaging a respective one of said valve seats to shut off the outlet with which the seat is associated upon movement of said element because of a drop in pressure at one of said outlets.

2. A system according to claim 1, wherein said valve heads have electrically conductive means, a pair of spaced electrical contacts at each one of said outlets adapted to be bridged by said conductive means when its respective outlet is closed, and a network including indicator means and a source of electricity connected to said contacts to provide an indication that one of said outlets has been closed.

3. A system as in claim 2, each of said pair of contacts normally spaced from said valve heads and being of a resilient material to bias said valve head out of engagement with its respective valve seat when the pressure of said fluid is equal at each of said outlets.

4. In a hydraulic fluid braking system having front and rear wheels, a source of hydraulic fluid, a tubular body including a bore having an inlet at the middle thereof adapted for connection to a master cylinder, a member secured to each end of said body having an outlet connected with said front and rear wheel brakes respectively, said outlets each having an inwardly facing valve seat, and a normally unrestricted freely movable shuttle valve element smaller than and loosely fitted in the bore of said body and having opposite end portions for respectively engaging one of said valve seats to shut off the outlet associated therewith and being of substantially the same density as said hydraulic fluid.

5. A valve according to claim 4, wherein a pair of spaced switch contacts are mounted on each of said end members adjacent the valve seat thereof and said valve element has electrically conductive end portions adapted to bridge said switch contacts when in engagement with its respective valve seat.

6. A valve as in claim 5, each of said pair of contacts normally spaced from said valve heads and being of a resilient material to bias said valve head out of engagement with its respective valve seat when the pressure of said fluid is equal at each of said outlets.

7. In a fluid braking system for vehicles having two or more fluid operated brakes, a source of fluid, a safety device comprising a housing having a bore to receive said fluid for operating said brakes, outlet means in opposite ends of said housing and each being connected with a respective one of said brakes to conduct the braking fluid thereto, means smaller than and fitted loosely and freely and normally unrestrictedly movable in said housing in the path of said braking fluid, said movable means being of substantially the same density as said fluid and having means thereon against which only the forces of the braking fluid act to retain the movable means in a position in said housing away from said opposite end outlet means when the pressure of said fluid at each of said outlet means is equal, and valve means at each end of said movable means engageable with a respective one of said opposite end outlet means to close the same when the pressure thereat is below that of the other of said opposite end outlet means.

8. In a fluid braking system as in claim 7, resilient contact means in said housing normally spaced in relationship with respect to said valve means and engageable with said valve means to move the same out of engagement with said outlet means.

References Cited in the file of this patent

UNITED STATES PATENTS

| | | |
|---|---|---|
| 2,472,056 | Otis | May 31, 1949 |
| 2,648,733 | Billings | Aug. 11, 1953 |
| 2,854,016 | Margida | Sept. 30, 1958 |
| 3,021,859 | Liantonio et al. | Feb. 20, 1962 |